United States Patent [19]

Howard

[11] Patent Number: 4,618,004

[45] Date of Patent: Oct. 21, 1986

[54] METHOD AND APPARATUS FOR BUILDING BORDERS

[76] Inventor: Cecil J. Howard, P.O. Box 294, Wasco, Calif. 93280

[21] Appl. No.: 653,095

[22] Filed: Sep. 24, 1984

[51] Int. Cl.⁴ ............................................. A01B 13/02
[52] U.S. Cl. ..................................... 172/176; 172/701; 172/199; 37/142.5; 405/36
[58] Field of Search ............... 172/176, 701, 199, 200, 172/168; 405/36, 179; 37/98, 142.5

[56] References Cited

U.S. PATENT DOCUMENTS

| | | | |
|---|---|---|---|
| 1,215,011 | 2/1917 | Findley | 172/684.5 |
| 1,238,616 | 8/1917 | Wyatt | 172/701 |
| 1,739,022 | 12/1929 | Wallich | 172/684.5 |
| 1,799,424 | 4/1931 | Jersey . | |
| 1,835,208 | 12/1931 | Domries | 172/701 |
| 2,205,038 | 6/1940 | Hiesermann . | |
| 2,644,252 | 7/1953 | Brown | 172/701 |
| 2,739,396 | 3/1956 | Frenzel | 172/701 |
| 2,964,864 | 12/1960 | Barnes | 172/799.5 |
| 3,454,104 | 7/1969 | Fuchs | 172/176 |
| 3,760,885 | 9/1973 | McKenzie | 172/574 |

FOREIGN PATENT DOCUMENTS

| | | | |
|---|---|---|---|
| 1562157 | 2/1969 | France | 172/701 |
| 401300 | 3/1974 | U.S.S.R. | 172/701 |
| 460025 | 7/1975 | U.S.S.R. | 172/176 |

Primary Examiner—Richard J. Johnson
Attorney, Agent, or Firm—Fulwider, Patton, Rieber, Lee & Utecht

[57] ABSTRACT

This invention is directed to an improved method and apparatus for building ridges and borders on agricultural fields which are suitable for the containment of irrigation water in such fields. The apparatus comprises means to cultivate at least a pair of trenches, means to remove dirt from the cultivated trenches and deposit dirt removed from the trenches onto the ground between the trenches and means to compress and shape the deposited dirt into a ridge or border.

8 Claims, 5 Drawing Figures

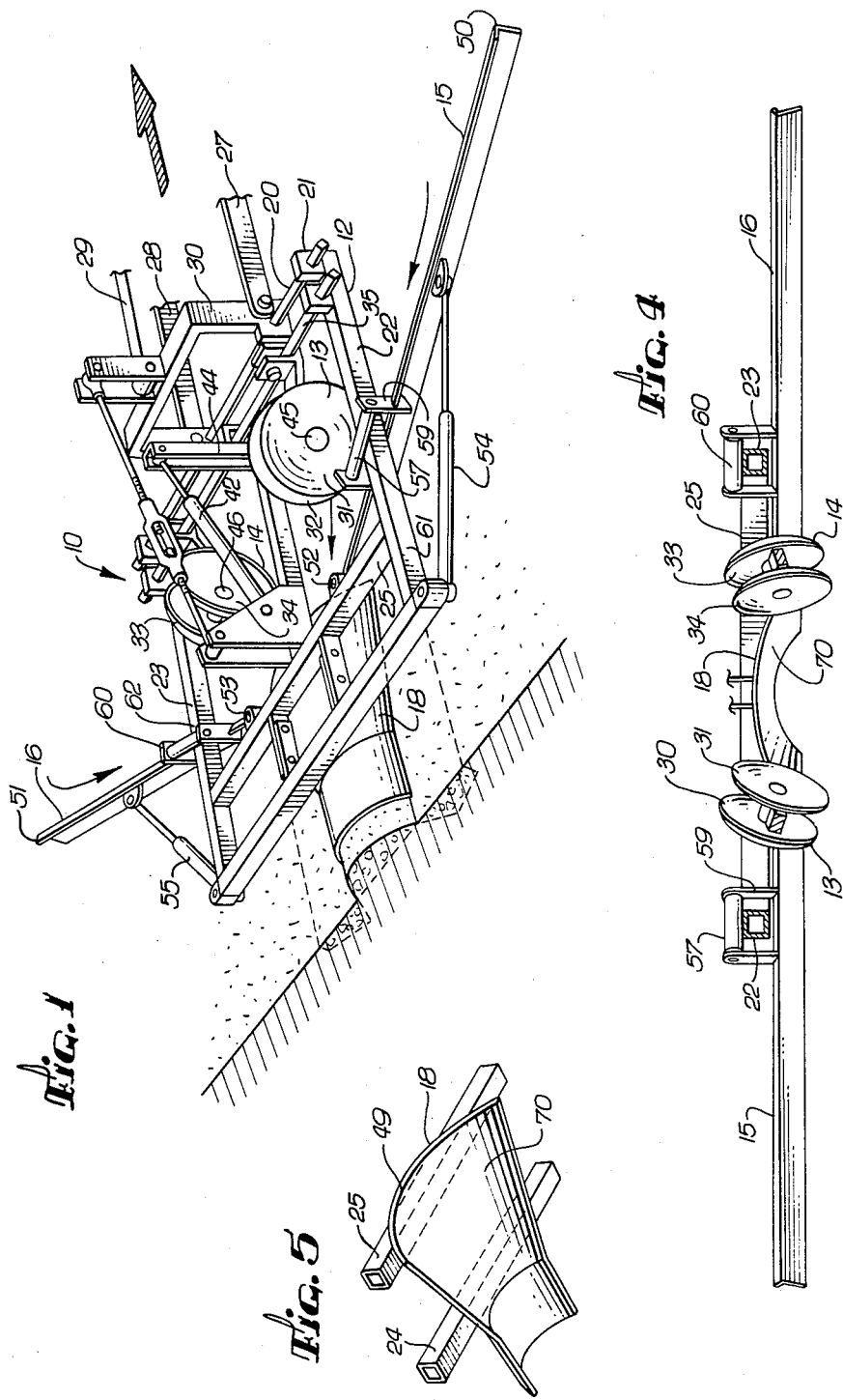

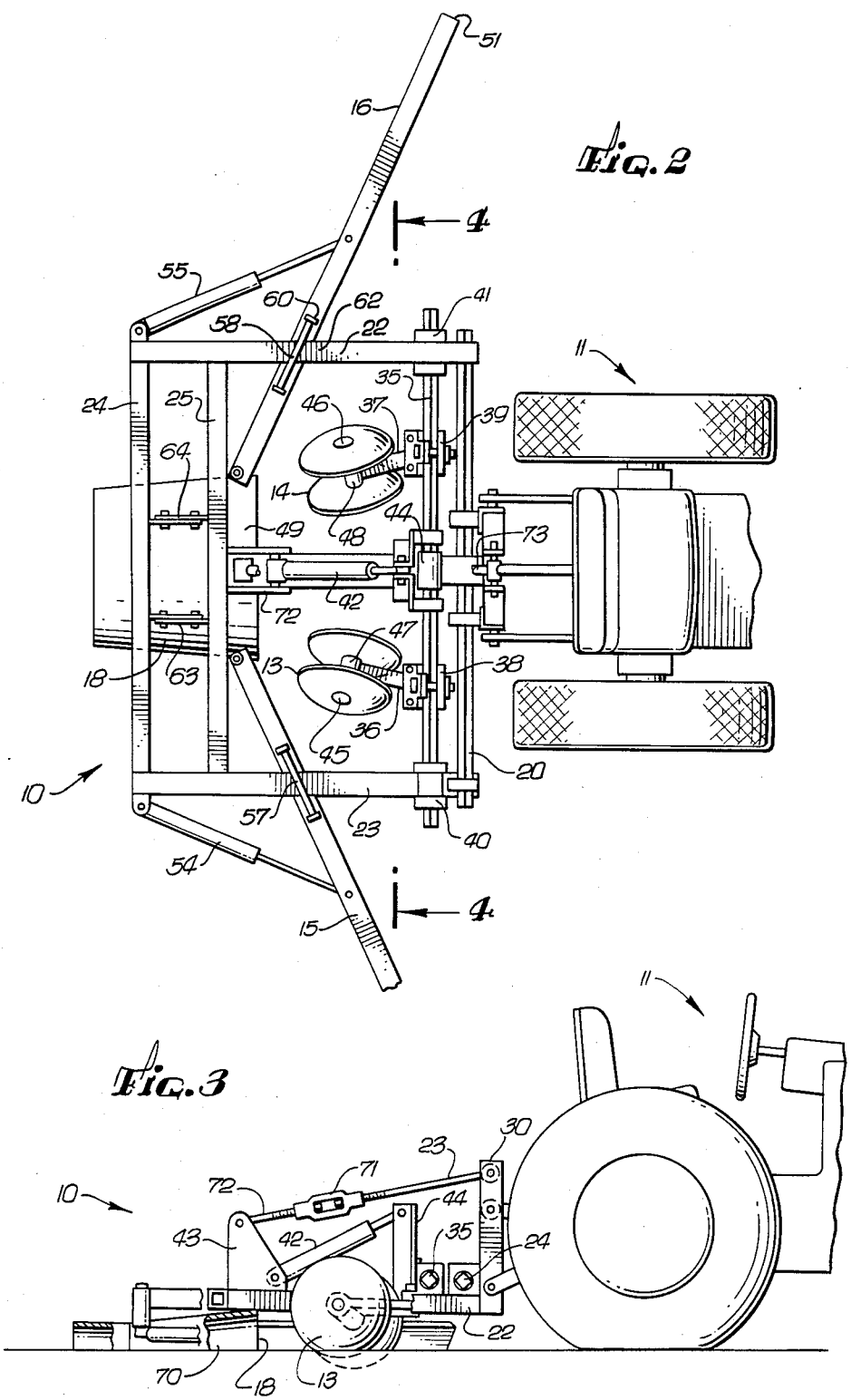

METHOD AND APPARATUS FOR BUILDING BORDERS

BACKGROUND OF THE INVENTION

This invention relates to a method and apparatus for building borders or ridges on agricultural lands which are to be flood irrigated.

When growing crops such as alfalfa, rice and the like, in areas of the country where agricultural lands must be irrigated, such crops are usually irrigated by flooding, hence the term "flood irrigation". Efficient flood irrigation requires that the land be level and further that the land be broken up into small parcels (commonly called checks) with earthen ridges or borders around each of the parcels to contain the irrigation water. If the parcels are too large, the irrigation water will tend to permeate into the ground before progressing over the entire parcel, which is a very inefficient use of irrigation water. If a parcel is not level, the crop growth pattern will be uneven resulting in a loss in production.

The land on which such crops are grown in usually dedictated to these crops for several years, so land preparation prior to planting crops is very important. Very little can be done after planting to relevel the land and rebuilding large sections of ridges or borders is very labor intensive and expensive.

In the past, a variety of equipment has been used by farmers for building the containment borders or ridges needed for flood irrigation. For the most part, these devices have involved the use of blades or scrapers of some sort which scrape dirt off the surface of the field and direct the dirt into a mechanism which forms or builds the border or ridge. The borders and ridges constructed by the prior devices were not consistently strong and durable and frequently were subject to channeling and water penetration which allowed the loss of water to adjacent parcels. This of course increased the labor cost for the crop because of the increased maintenance of the ridges or borders and also reduced the production of such crops because of the unequal irrigation.

Farmers have long recognized the need for a simple, efficient and economical means for building strong, durable borders to facilitate flood irrigation. The present invention fulfills this need.

SUMMARY OF THE INVENTION

This invention is directed to an improved method and device for building strong, durable containment borders or ridges in agricultural fields to be flood irrigated. Moreover, the invention allows such ridges or borders to be formed in a simple, highly efficient and low cost manner.

The device of the invention generally comprises at least two opposed cultivating elements which cultivate at least two parallel trenches, means to remove cultivated dirt from the trenches and to deposit cultivated dirt onto the ground between the trenches, a molding element which compresses and shapes the excavated cultivated dirt on the ground between the essentially parallel trenches into a ridge or border and a pair of scraper means such as blades or cutters for scraping dirt from the surface of the field along the outside of the trenches to the trenches to replace the dirt removed therefrom. In a preferred embodiment disk plows are utilized to cultivate the parallel trenches and the opposed disk plows are oriented toward the center and the forward end of the device to remove cultivated dirt from the trenches and deposit the dirt on the ground between the trenches.

The borders so built are very strong and last much longer than borders built by other devices. Moreover, because the blades are merely replacing dirt excavated from the trenches, a large quantity of dirt does not have to be moved, so the device can be pulled through the field at a much faster rate than prior border building machines. In accordance with a preferred embodiment, the blade angles are adjustable so that as the device is pulled close to the edge of a field, the angle between the blades can be increased considerably, thus allowing a border to be built much closer to the edge of the field than other devices.

These and other features and advantages of the invention will become apparent from the following more detailed description, when taken in conjunction with the accompanying exemplary drawings of a preferred embodiment.

DESCRIPTION OF THE DRAWINGS

FIG. 1 is a perspective view of a preferred border building device embodying features of the invention;

FIG. 2 is a plan view of the device shown in FIG. 1;

FIG. 3 is a side elevation view with parts removed;

FIG. 4 is a view taken along the lines of 4—4 shown in FIG. 3; and

FIG. 5 is a perspective view of the shaping means illustrating the shaping surfaces.

In all of the above drawings corresponding parts are numbered the same.

DESCRIPTION OF THE PREFERRED EMBODIMENT

Reference is made to FIGS. 1, 2 and 3 which illustrate a device 10 for building containment borders embodying features of the invention. The border building device 10, shown in the drawing in a position behind a towing vehicle 11 shown in phantom, generally comprises a mobile frame 12 for supporting components of the device, at least one pair of opposed, spaced apart cultivating means or assemblies 13 and 14 for cultivating parallel furrows or trenches in an agricultural field and which preferably includes means to remove cultivated dirt from the trenches and to deposit the dirt onto the ground between the parallel trenches, a pair of opposed, spaced apart scraper blades 15 and 16 for scraping dirt from the field on both sides of the parallel trenches into the trenches and shaping means 18 for compressing and shaping the dirt deposited onto the ground between the trenches into a strong and durable ridge or border.

As best shown in FIGS. 1-3, the structural elements of the frame 12 comprise a frontal cross beam 20 on the front or towing end 21 thereof, which is attached at both ends thereof to two longitudinal side beams 22 and 23 and two parallel cross beams 24 and 25 at the rear end 26 of the frame 12 which are attached at both ends thereof to the longitudinal side beams 22 and 23.

Towing arms 27, 28 and 29 are bolted to an upstanding angle bracket 30 rotatably mounted on the front cross beam 20 and are secured by a suitable means (not shown) to the towing mechanism of towing vehicle 11.

Each of cultivating assemblies 13 and 14, comprise a pair of rotatable disk plows 31, 32 and 33, 34, respectively, which are supported from a rotatable cross member 35 by extensions 36 and 37 which are rigidly fixed to the cross member 35 by means of slidable brackets 38 and 39. The ends of cross member 35 are rotatably mounted onto the longitudinal side beams 22 and 23 so that the cross member 35 can be rotated about its longitudinal axis to raise or lower the cultivating assemblies 13 and 14 to thereby increase or decrease the amount of dirt fed to the shaping means 18 for building the border. The brackets 38 and 39 holding the extensions 36 and 37 to the cross member 35 are slideable so that the distance between the cultivating assemblies 13 and 14 can be changed as needed.

An hydraulic actuator 40 is bolted at one end to an upstanding bracket 41 fixed to rotatable cross member 35 and bolted at the other end thereof to the upper portion of upstanding bracket 43 which is rigidly connected to center beam 44. By operating the hydraulic actuator 42, the upstanding bracket 44 causes the cross beam 35 to rotate about its longitudinal axis, thereby raising or lowering, as the case may be, the cultivating assemblies 13 and 14. The individual disk plows 31, 32 and 33, 34 are paired through axles 45 and 46 journaled in the housings 47 and 48 which are mounted onto extensions 36 and 37. The disk plows 31-34 are mounted on the axles 45 and 46 with the concave surfaces thereof facing inwardly toward the center line and forwardly toward the front end of the device, because when oriented in this manner, the disk plows not only act as means to cultivate the trenches but also act as the means to remove the cultivated dirt from the trenches and depositing the dirt onto the ground between the trenches.

Scraper blades 15 and 16 are disposed on the frame with the leading ends thereof, extending outwardly toward the front or towing end 21 of the frame 12 and the trailing ends thereof converging toward the center line of the device and secured to the cross member 24. Preferably the trailing ends of blades 15 and 16 are pivotally mounted immediately adjacent to both sides of the feed end 49 of the shaping means 18. The angle between the blades 15 and 16 can be varied by operating the hydraulic actuators 54 and 55 which are pivotally mounted on the rear cross member 25 and centrally on the blades 15 and 16. The blades 15 and 16 are vertically supported from the longitudinal side beams 22 and 23, respectively, by means of rollers 57 and 58, which are mounted on brackets 59 and 60 fixed to the blades 15 and 16 and which are adapted to roll on the upper surfaces of the longitudinal side beams 22 and 23 to allow for blade movement.

The shaping means 18 which is adapted to compress and shape the dirt to form the border is secured to the rear cross members 24 and 25 by means of brackets 63 and 64 which are welded or otherwise connected to both the top of the shaping means 18 and the cross members 24 and 25. The shaping means 18, shown in more detail in FIG. 5, is usually formed from a thick steel plate and the inner surface 70 is shaped so it converges from the feed end to the desired shape of the ridge or border at the discharge end of the shaping means 18.

The vertical disposition of the frame 12 can be adjusted, i.e., raised or lowered, by means of the turnbuckle 71 which is coupled to the bars 72 and 73 pivotally connected to the upstanding brackets 30 and 43.

It is generally contemplated that a towing vehicle will pull the device over the agricultural field on which borders are to be built. The cultivating assemblies 13 and 14 are vertically adjustable so that the amount of dirt which is excavated from the parallel trenches and deposited on the ground between the trenches is suitable to form a continuous border of the desired size, shape and density. The scraper blades 15 and 16 with the leading ends thereof angled toward the front end of the device, scrape the loose dirt from the field along both sides of the trenches and direct the loose dirt into the trenches formed by the cultivating assemblies. The shaping means 18 compresses and shapes the dirt deposited between the cultivating assemblies 13 and 14 into a strong and durable ridge or border of the desired shape and density.

The use of cultivated soil, as opposed to soil which is scraped from the surface of the field, is a substantial factor in forming the strong and durable borders of the invention. Moreover, by filling the trenches formed by the disc plows with dirt scraped from the field, the channeling of irrigation water along the edge of the border, which can accelerate the penetration of water into the border and lead to its early destruction is minimized.

It is most desirable to form the earthen borders as close as possible to the edge of the field to utilize as much of the field as possible and to reduce the manual labor in forming the interconnecting borders. In a preferred embodiment, the trailing ends of the scraper blades are pivotally mounted at or near the feed end of the shaping means, and by operating the hydraulic actuators to pull the leading ends of the blades nearly perpendicular to the longitudinal axis of the device, an earthen border can be built very close to the edge of the field, much closer than prior devices.

Although only one specific embodiment of the invention has been described in detail, it is to be understood that other embodiments and modifications thereof can be made without departing from the inventive concepts. For example, as previously described, the disk plows when oriented inwardly and forwardly operate as both the means to cultivate the trenches and the means to remove the cultivated dirt and deposit the dirt onto the ground between the trenches. It is readily evident to those skilled in the art that separate means can be employed to perform the two separate functions.

I claim:

1. A device for building earthen ridges or borders on an agricultural field comprising:
   a. a mobile supporting frame assembly;
   b. a pair of opposing spaced apart disc plow assemblies supported from the frame assembly and adapted to cultivate parallel trenches in the agricultural field, to remove cultivated dirt from the parallel trenches and to deposit the removed dirt onto the ground between the trenches;
   c. means to scrape dirt into the trenches from the agricultural field, blade means extending outwardly from the trenches to scrape dirt into the trenches from the agricultural field adjacent thereto, the lower edges of said blade means being at a higher level than the lower edges of the disc plow assemblies; and
   d. means to compress and shape the dirt deposited on the ground between the trenches to form the earthen borders or ridges.

2. The device of claim 1 wherein the disc plows have concave faces.

3. The device of claim 1 wherein the means to scrape dirt from the field comprises scraper blades.

4. The device of claim 3 wherein the scraper blades are mounted to pivot at the trailing ends thereof.

5. The device of claim 4 wherein hydraulic actuators move the blades about the pivotally mounted trailing ends thereof.

6. The device of claim 2 wherein the disc plows have concave faces which are oriented inwardly and forwardly.

7. The device of claim 1 wherein the mobile supporting frame assembly provides means for towing the device by a towing vehicle.

8. A method for forming earthen ridges or borders on an agricultural field comprising:
   (a) cultivating parallel trenches in an agricultural field by means of spaced apart disc plow assemblies which remove cultivated dirt from the trenches and deposit the removed dirt onto the ground between the trenches;
   (b) scraping dirt into the trenches from the agricultural field by means of blade means extending outwardly from the trenches to scrape dirt into the trenches from the agricultural field adjacent thereto, the lower edges of said blade means being at a higher level than the lower edges of the disc plow assemblies; and
   (c) continuously compressing and shaping the dirt deposited between the trenches into earthen ridges or borders.

* * * * *